(12) United States Patent
Hairston

(10) Patent No.: US 6,640,954 B1
(45) Date of Patent: Nov. 4, 2003

(54) APPLIANCE TIMING SYSTEM

(76) Inventor: James E. H. Hairston, 1185 Manchester Rd., Akron, OH (US) 44307

( * ) Notice: Subject to any disclaimer, the term of this patent is extended or adjusted under 35 U.S.C. 154(b) by 123 days.

(21) Appl. No.: 09/960,049

(22) Filed: Sep. 21, 2001

(51) Int. Cl.[7] .............................. G07F 7/00; G07F 15/12
(52) U.S. Cl. ..................... 194/208; 194/213; 194/304
(58) Field of Search ............................ 194/205, 209, 194/211, 213, 214, 241, 242, 304, 310, 312, 315, 316

(56) References Cited

U.S. PATENT DOCUMENTS

| | | | | |
|---|---|---|---|---|
| 3,197,006 A | * | 7/1965 | Rub et al. ................. | 194/242 |
| 3,778,637 A | * | 12/1973 | Arita ......................... | 307/140 |
| 3,897,862 A | * | 8/1975 | James ........................ | 194/209 |
| 3,944,039 A | * | 3/1976 | Houghtaling .............. | 194/208 |
| RE29,796 E | * | 10/1978 | Yamamoto et al. ........ | 194/210 |
| 4,231,458 A | * | 11/1980 | Limone et al. ............ | 194/211 |
| 4,367,957 A | * | 1/1983 | Bradley ..................... | 368/114 |
| 4,458,802 A | * | 7/1984 | Maciver et al. ............ | 194/205 |
| 4,624,578 A | * | 11/1986 | Green ......................... | 368/10 |
| 4,717,815 A | * | 1/1988 | Tomer ........................ | 235/378 |
| 5,143,193 A | * | 9/1992 | Geraci ........................ | 194/212 |
| 5,146,067 A | * | 9/1992 | Sloan et al. ................ | 235/381 |

* cited by examiner

Primary Examiner—F. J. Bartuska

(57) ABSTRACT

An appliance timing system includes a housing that has a perimeter all for defining an interior space. A switching assembly is positioned within the interior space of the housing. The switching assembly is operationally coupled between the appliance and a power source. The switching assembly is for allowing power from the power source to be provided to the appliance when the user actuates the switching assembly. A card is insertable into the interior space of the housing through a slot in the perimeter wall of the housing. The card is for actuating the switching assembly when the user inserts the card into the slot of the housing. A timer assembly is operationally coupled between the switching assembly and the appliance. The timer assembly is for allowing the appliance to operate for the pre-determined amount of time before discontinuing power to the appliance.

18 Claims, 4 Drawing Sheets

APPLIANCE TIMING SYSTEM

BACKGROUND OF THE INVENTION

1. Field of the Invention

The present invention relates to appliance timing systems and more particularly pertains to a new appliance timing system for allowing a user to control an electronic or electrical device for a predetermined amount of time.

2. Description of the Prior Art

The use of appliance timing systems is known in the prior art. More specifically, appliance timing systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,944,039; U.S. Pat. No. 4,367,957; U.S. Pat. No. 4,458,802; U.S. Pat. No. 4,624,578; U.S. Pat. No. 4,717,815; U.S. Pat. No. 5,143,193; and U.S. Pat. No. 5,146,067.

While these devices fulfill their respective, particular objectives and requirements, the aforementioned patents do not disclose a new appliance timing system. The inventive device includes a housing that has a perimeter wall for defining an interior space. The perimeter wall of the housing is adapted for coupling to the appliance. A switching assembly is positioned within the interior space of the housing. The switching assembly is operationally coupled between the appliance and a power source. The switching assembly is adapted for allowing power from the power source to be provided to the appliance when the user actuates the switching assembly. A card is insertable into the interior space of the housing through a slot in the perimeter wall of the housing. The card actuating the switching assembly when the card is inserted into the slot of the housing by the user such that the switching assembly permits the power supply to provide power to the appliance. A timer assembly is operationally coupled between the switching assembly and the appliance. The timer assembly is adapted for allowing the appliance to operate for the predetermined amount of time before discontinuing power to the appliance.

In these respects, the appliance timing system according to the present invention substantially departs from the conventional concepts and designs of the prior art, and in so doing provides an apparatus primarily developed for the purpose of allowing a user to control an electronic or electrical device for a predetermined amount of time.

SUMMARY OF THE INVENTION

In view of the foregoing disadvantages inherent in the known types of appliance timing systems now present in the prior art, the present invention provides a new appliance timing system construction wherein the same can be utilized for allowing a user to control an electronic or electrical device for a predetermined amount of time.

The general purpose of the present invention, which will be described subsequently in greater detail, is to provide a new appliance timing system apparatus and method which has many of the advantages of the appliance timing systems mentioned heretofore and many novel features that result in a new appliance timing system which is not anticipated, rendered obvious, suggested, or even implied by any of the prior art appliance timing systems, either alone or in any combination thereof.

To attain this, the present invention generally comprises a housing that has a perimeter wall for defining an interior space. The perimeter wall of the housing is adapted for coupling to the appliance. A switching assembly is positioned within the interior space of the housing. The switching assembly is operationally coupled between the appliance and a power source. The switching assembly is adapted for allowing power from the power source to be provided to the appliance when the user actuates the switching assembly. A card is insertable into the interior space of the housing through a slot in the perimeter wall of the housing. The card actuating the switching assembly when the card is inserted into the slot of the housing by the user such that the switching assembly permits the power supply to provide power to the appliance. A timer assembly is operationally coupled between the switching assembly and the appliance. The timer assembly is adapted for allowing the appliance to operate for the pre-determined amount of time before discontinuing power to the appliance.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new appliance timing system apparatus and method which has many of the advantages of the appliance timing systems mentioned heretofore and many novel features that result in a new appliance timing system which is not anticipated, rendered obvious, suggested, or even implied by any of the prior art appliance timing systems, either alone or in any combination thereof.

It is another object of the present invention to provide a new appliance timing system, which may be easily and efficiently manufactured and marketed.

It is a further object of the present invention to provide a new appliance timing system, which is of a durable and reliable construction.

An even further object of the present invention is to provide a new appliance timing system which is susceptible of a low cost of manufacture with regard to both materials and labor, and which accordingly is then susceptible of low prices of sale to the consuming public, thereby making such appliance timing system economically available to the buying public.

Still yet another object of the present invention is to provide a new appliance timing system, which provides in the apparatuses and methods of the prior art some of the advantages thereof, while simultaneously overcoming some of the disadvantages normally associated therewith.

Still another object of the present invention is to provide a new appliance timing system for allowing a user to control an electronic or electrical device for a predetermined amount of time.

Yet another object of the present invention is to provide a new appliance timing system, which includes a housing that has a perimeter wall for defining an interior space. The perimeter wall of the housing is adapted for coupling to the appliance. A switching assembly is positioned within the interior space of the housing. The switching assembly is operationally coupled between the appliance and a power source. The switching assembly is adapted for allowing power from the power source to be provided to the appliance when the user actuates the switching assembly. A card is insertable into the interior space of the housing through a slot in the perimeter wall of the housing. The card actuating the switching assembly when the card is inserted into the slot of the housing by the user such that the switching assembly permits the power supply to provide power to the appliance. A timer assembly is operationally coupled between the switching assembly and the appliance. The timer assembly is adapted for allowing the appliance to operate for the pre-determined amount of time before discontinuing power to the appliance.

Still yet another object of the present invention is to provide a new appliance timing system that would be of rugged construction that would make it well suited to the demands of the appliance rental industry eliminating the need to use coins to operate the appliance in question.

Even still another object of the present invention is to provide a new appliance timing system that could be adapted for use on common makes and models of laundry and other major appliances and even home entertainment equipment. The nature of its design would make it fairly difficult to defeat.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
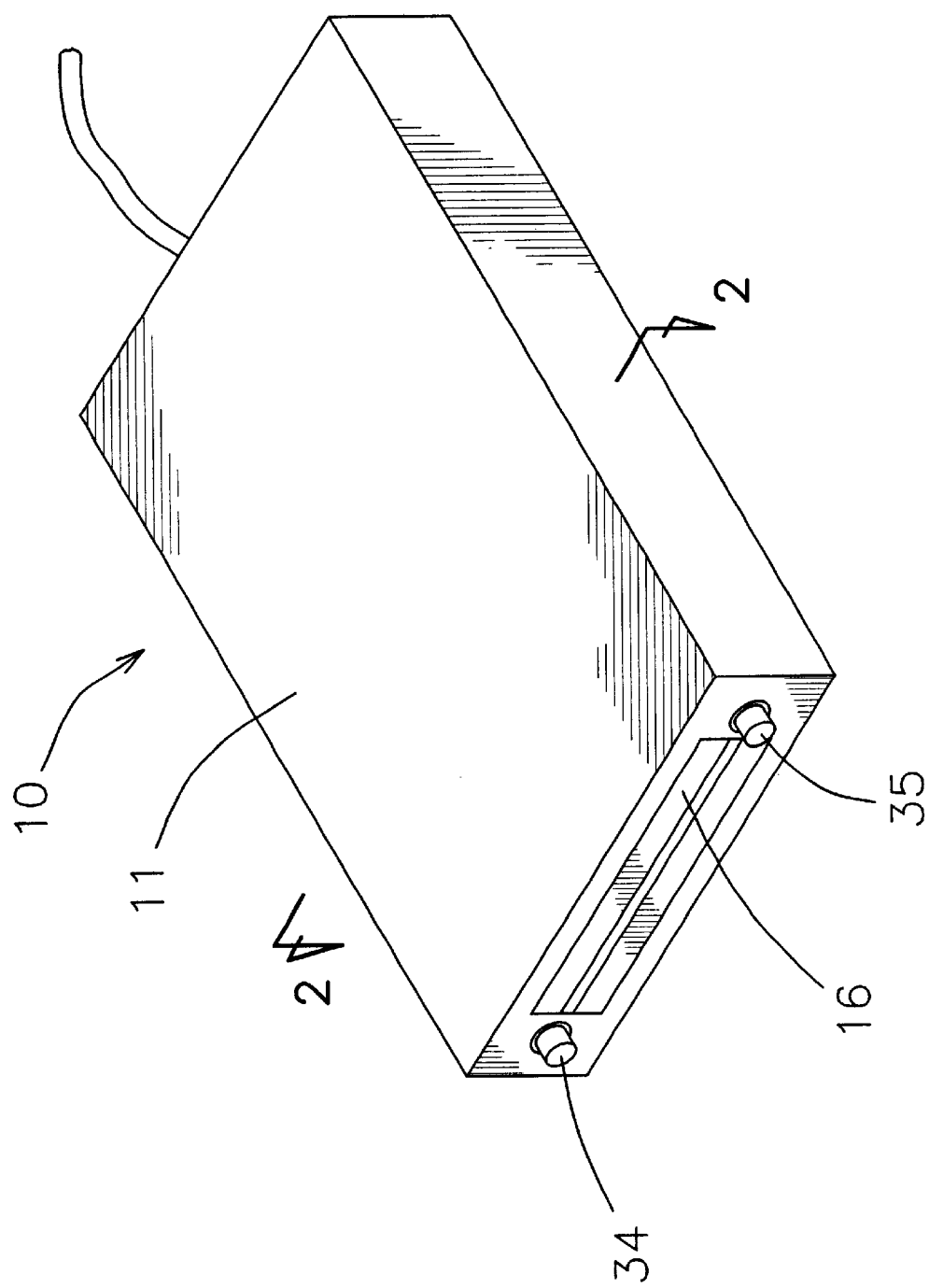
FIG. 1 is a perspective view of a new appliance timing system according to the present invention.
Figure 2:
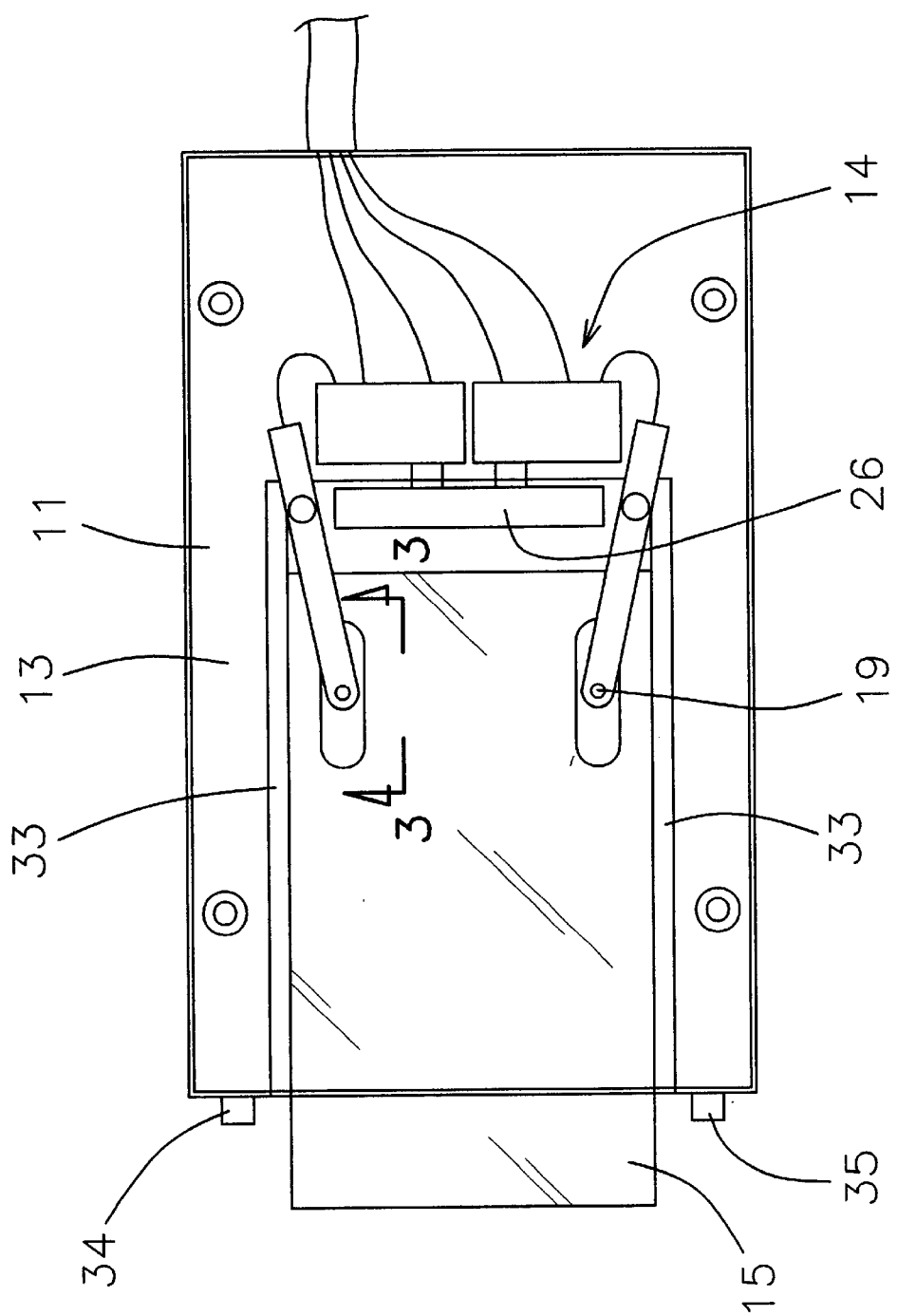
FIG. 2 is a top view of the present invention.
Figure 4:
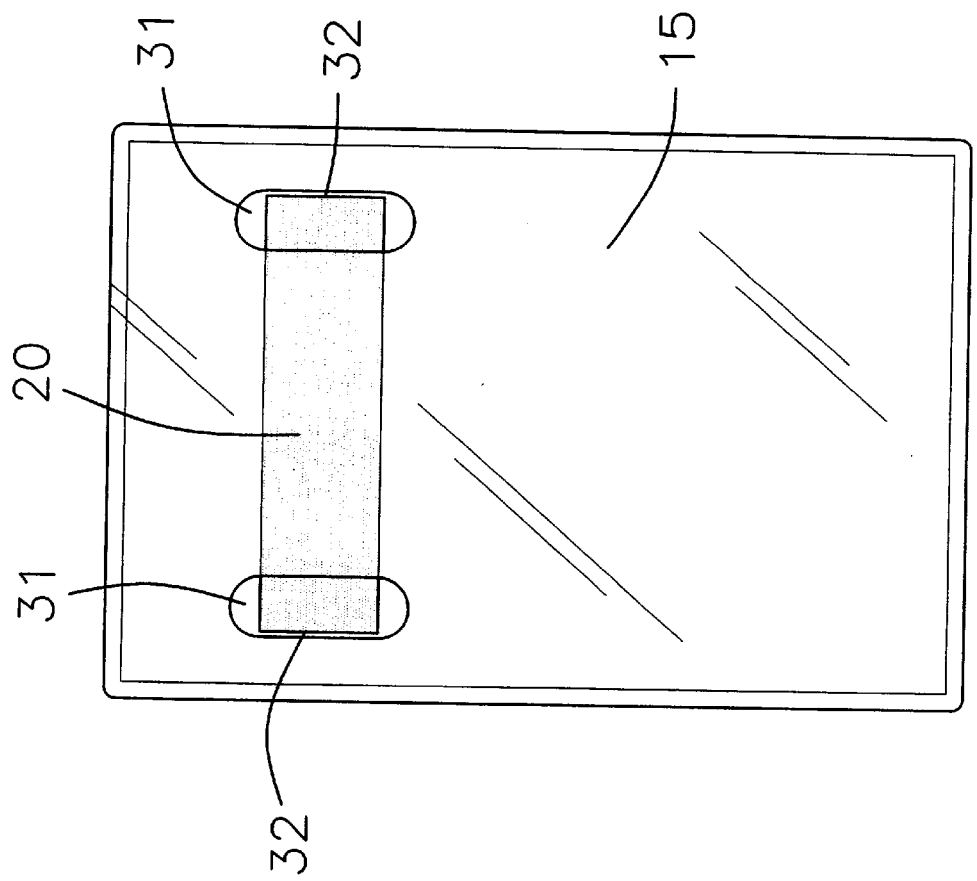
FIG. 4 is a bottom view of the present invention.
Figure 3:
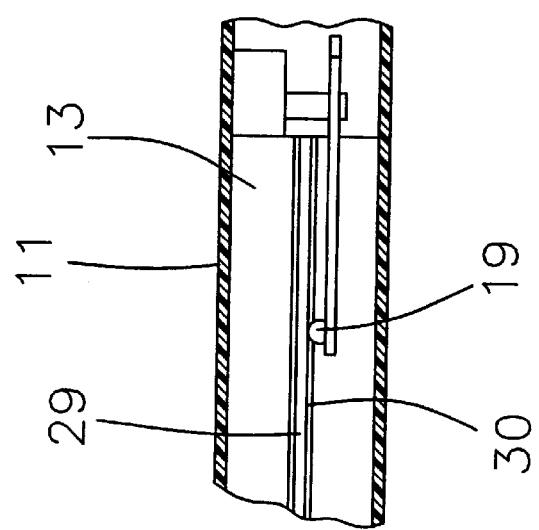
FIG. 3 is a cross-sectional view of the present invention.
Figure 5:
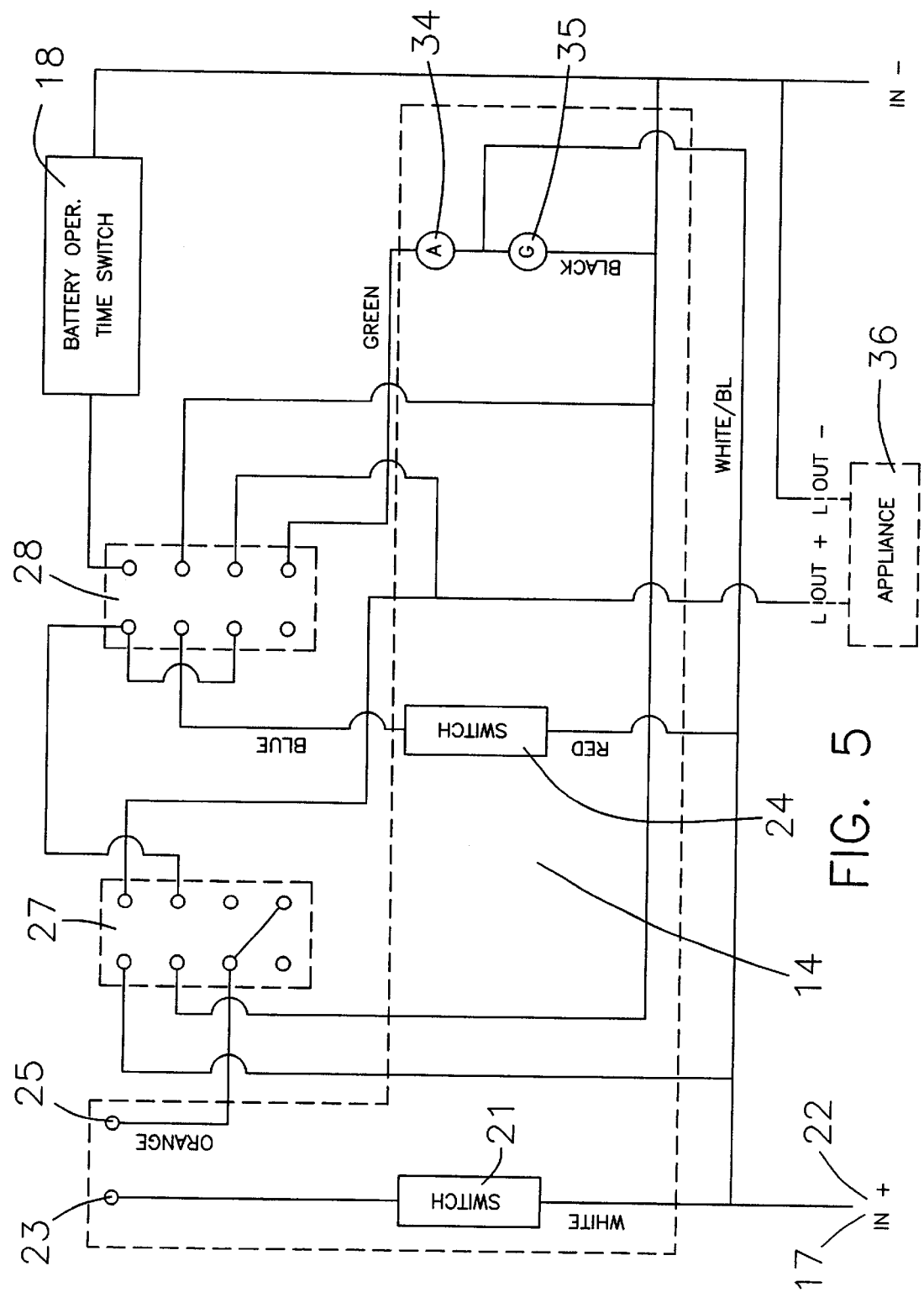
FIG. 5 is a schematic view of the present invention.

With reference now to the drawings, and in particular to FIGS. 1 through 5 thereof, a new appliance 36 timing system embodying the principles and concepts of the present invention and generally designated by the reference numeral 10 will be described.

As best illustrated in FIGS. 1 through 5, the appliance 36 timing system 10 generally includes a housing 11 that has a perimeter wall 12 for defining an interior space 13. The perimeter wall 12 of the housing 11 is adapted for coupling to the appliance 36. A switching assembly 14 is positioned within the interior space 13 of the housing 11. The switching assembly 14 is operationally coupled between the appliance 36 and a power source. The switching assembly 14 is adapted for allowing power from the power source to be provided to the appliance 36 when the user actuates the switching assembly 14. A card 15 is insertable into the interior space 13 of the housing 11 through a slot 16 in the perimeter wall 12 of the housing 11. The card 15 actuating the switching assembly 14 when the card 15 is inserted into the slot 16 of the housing 11 by the user such that the switching assembly 14 permits the power supply 17 to provide power to the appliance 36. A timer assembly 18 is operationally coupled between the switching assembly 14 and the appliance 36. The timer assembly 18 is adapted for allowing the appliance 36 to operate for the predetermined amount of time before discontinuing power to the appliance 36.

The switching assembly 14 has a pair of contacts 19. The contacts 19 are positioned within the interior space 13 of the housing 11. The contacts 19 are in a spaced relationship with each other. The contacts 19 selectively contacting a conductive strip 20 on the card 15 when the card 15 is inserted into the housing 11. The conductive strip 20 of the card 15 is for permitting electrical communication between the contacts 19 when the card 15 is inserted in the housing 11 such that the conductive strip 20 operationally couples the timer assembly 18 to the power supply 17.

The switching assembly 14 has a first switch 21. The first switch 21 is operationally coupled between the power source 22 and a first of the contacts 23. The first switch 21 is actuatable when the card 15 is inserted in the housing 11. The first switch 21 is adapted for controlling power from the power supply 17 to the first of the contacts 23 such that the first switch 21 permits power to be supplied to the first of the contacts 23 when the first switch 21 is actuated by insertion of the card 15 into the housing 11.

The switching assembly 14 has a second switch 24. The second switch 24 is operationally coupled between the appliance 36 and a second of the contacts 25. The second switch 24 is actuatable when the card 15 is inserted in the housing 11. The second switch 24 is adapted for controlling power from the second of the contacts 25 to the appliance 36 when the second switch 24 is actuated by insertion of the card 15 into the housing 11 and the conducting strip 20 of the card 15 electrically couples the contacts 19.

The switching assembly 14 has an activation bar 26. The activation bar 26 is slidably coupled to the housing 11 within the interior space 13 of the housing 11 such that the card 15 engages the activation bar 26 when the card 15 is inserted into the interior space 13 of the housing 11. The activation bar 26 is coupled to the first switch 21 and the second switch 24 such that the activation bar 26 actuates the first switch 21 when the card 16 engages the activation bar 26.

A first relay 27 is operationally coupled between one of the contacts 19 and a second relay 28. The second relay 28 is operationally coupled between the first relay 27 and the timer assembly 18. The first relay 27 is adapted for being energized by the power supply 17. The second relay 28 is energized by the power supply 17 through the first relay 27 when the contacts 19 contact the conductive strip 20. The second relay 28 is for activating the timer assembly 18 when the second relay 28 is energized such that the timer assembly 18 permits operation of the appliance 36 for the pre-determined amount of time.

The conductive strip 20 of the card 15 acts as a fusible link. The conductive strip 20 opens when the electrical current that flows through the conductive strip 20 exceeds a predetermined value such that electrical communication between the contacts 19 is broken.

The card 15 has top wall 29 and a bottom wall 30. The top wall 29 and the bottom wall 30 include a non-conductive material. The conductive strip 20 is positioned between the top wall 29 and the bottom wall 30. The bottom wall 30 has a pair of apertures 31 through the bottom wall 30. Each of the apertures 31 is aligned with one of a pair of ends 32 of the conductive strip 20 of the card 15. The apertures 31 allow each of the contacts 19 to contact the conductive strip 20 when the card 15 is inserted into the interior space 13 of the housing 11.

The housing 11 has a pair of rails 33. The rails 33 are positioned within the interior space 13 of the housing 11. The rails 33 extend from the slot 16 in the perimeter wall 12 such that the rails 33 are for guiding the card 15 into the interior space 13 of the housing 11 when the card 15 is inserted into the housing 11.

A first light 34 that is green in color is coupled to the housing 11. The first light 34 is operationally coupled between the switching assembly 14 and the power source 22. The first light 34 emits light when the power supply 17 supplies power to the switching assembly 14 and the first light 34.

A second light 35 that is amber in color is coupled to the housing 11. The second light 35 is operationally coupled, between the switching assembly 14 and the appliance 36. The second light 35 emits light when the card 15 is inserted into the interior space 13 of the housing 11 and actuates the switching assembly 14. The second light 35 is adapted for indicating to the user that the timer assembly 18 is operating.

In use, a user wanting to use the appliance in question would insert a new card into the reader until it met with resistance. At this time, a current would be conducted through the trace on the card, thereby triggering the timer. At the same the time the amber light would be extinguished and a current of sufficient strength applied to the card to burn out its conductive strip, thereby preventing the card from being used again. Once the timer would be triggered, it would permit the appliance in question to be used in a conventional manner.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An appliance timing system for permitting a user to use an appliance for a pre-determined amount of time, the appliance timing system comprising:

a housing has a perimeter wall defining an interior space, said perimeter wall of said housing being adapted for coupling to the appliance;

a switching assembly being positioned within said interior space of said housing, said switching assembly being operationally coupled between the appliance and a power source, said switching assembly being adapted for allowing power from the power source to be provided to the appliance when said switching assembly is actuated by the user;

a card being insertable into said interior space of said housing through a slot in said perimeter wall of said housing, said card actuating said switching assembly when said card is inserted into said slot of said housing by the user such that said switching assembly permits the power supply to provide power to the appliance;

a timer assembly being operationally coupled between said switching assembly and the appliance, said timer assembly being adapted for allowing the appliance to operate for the pre-determined amount of time before discontinuing power to the appliance;

said switching assembly has a pair of contacts, said contacts being positioned within said interior space of said housing, said contacts being in a spaced relationship with each other, said contacts selectively contacting a conductive strip on said card when said card is inserted into said housing, said conductive strip of said card permitting electrical communication between said contacts when said card is inserted in said housing such that said conductive strip operationally couples said timer assembly to the power supply; and a first relay being operationally coupled between one of said contacts and a second relay, said second relay being operationally coupled between said first relay and said timer assembly, said first relay being adapted for being energized by the power supply, said second relay being energized by said power supply through said first relay when said contacts contact said conductive strip, said second relay being for activating said timer assembly when said second relay is energized such that said timer assembly permits operation of said appliance for the pre-determined amount of time.

2. The appliance timing system as set forth in claim 1, further comprising;

said switching assembly has a first switch, said first switch being operationally coupled between the power source and an first of said contacts, said first switch being actuatable when said card is inserted in said housing, said first switch being adapted for controlling power from the power supply to said first of said contacts such that said first switch permits power to be supplied to said first of said contacts when said first switch is actuated by insertion of said card into said housing.

3. The appliance timing system as set forth in claim 2, further comprising;
said switching assembly has an activation bar, said activation bar being slidably coupled to said housing within said interior space of said housing such that said card engages said activation bar when said card is inserted into said interior space of said housing, said activation bar being coupled to said first switch such that said activation bar actuates said first switch when said card engages said activation bar.

4. The appliance timing system as set forth in claim 2, further comprising;
said switching assembly has a second switch, said second switch being operationally coupled between the appliance and a second of said contacts, said second switch being actuatable when said card is inserted in said housing, said second switch being adapted for controlling power from said second of said contacts to the appliance when said second switch is actuated by insertion of said card into said housing and said conducting strip of said card electrically couples said contacts.

5. The appliance timing system as set forth in claim 4, further comprising;
said switching assembly has an activation bar, said activation bar being slidably coupled to said housing within said interior space of said housing such that said card engages said activation bar when said card is inserted into said interior space of said housing, said activation bar being coupled to said first switch and said second switch such that said activation bar actuates said first switch and said second switch when said card engages said activation bar.

6. The appliance timing system as set forth in claim 1, further comprising;
said conductive strip of said card comprising a fusible link, said fusible link opening when a electrical current through said conductive strip exceeds a predetermined value such that electrical communication between said contacts is broken.

7. The appliance timing system as set forth in claim 1, further comprising;
said card has top wall and a bottom wall, said top wall and said bottom wall comprising a non-conductive material, said conductive strip being positioned between said top wall and said bottom, said bottom wall has a pair of apertures through said bottom wall, each of said apertures being aligned with one of a pair of ends of said conductive strip of said card, said apertures allowing each of said contacts to contact said conductive strip when said card is inserted into said interior space of said housing.

8. The appliance timing system as set forth in claim 1, further comprising;
said housing has a has a pair of rails, said rails being positioned within said interior space of said housing, said rails being extending from said slot in said perimeter wall such that said rails are for guiding said card into said interior space of said housing when said card is inserted into said housing.

9. The appliance timing system as set forth in claim 1, further comprising;
a first light being coupled to said housing, said first light being operationally coupled between said switching assembly and the power source, said first light emitting light when said power supply supplies power to said switching assembly and said first light.

10. The appliance timing system as set forth in claim 1, further comprising;
a second light being coupled to said housing, said second light being operationally coupled between said switching assembly and the appliance, said second light emitting light when said card is inserted into said interior space of said housing and actuates said switching assembly, said second light being adapted for indicating to the user that said timer assembly is operating.

11. The appliance timing system as set forth in claim 2, further comprising;
said switching assembly has a second switch, said second switch being operationally coupled between the appliance and a second of said contacts, said second switch being actuatable when said card is inserted in said housing, said second switch being adapted for controlling power from said second of said contacts to the appliance when said second switch is actuated by insertion of said card into said housing and said conducting strip of said card electrically couples said contacts.

12. An appliance timing system for permitting a user to use an appliance for a pre-determined amount of time, the appliance timing system comprising:
a housing has a perimeter wall defining an interior space, said perimeter wall of said housing being adapted for coupling to the appliance;
a switching assembly being positioned within said interior space of said housing, said switching assembly being operationally coupled between the appliance and a power source, said switching assembly being adapted for allowing power from the power source to be provided to the appliance when said switching assembly is actuated by the user;
a card being insertable into said interior space of said housing through a slot in said perimeter wall of said housing, said card actuating said switching assembly when said card is inserted into said slot of said housing by the user such that said switching assembly permits the power supply to provide power to the appliance; and
a timer assembly being operationally coupled between said switching assembly and the appliance, said timer assembly being adapted for allowing the appliance to operate for the predetermined amount of time before discontinuing power to the appliance;
wherein said switching assembly has a pair of contacts, said contacts being positioned within said interior space of said housing, said contacts being in a spaced relationship with each other, said contacts selectively contacting a conductive strip on said card when said card is inserted into said housing, said conductive strip of said card permitting electrical communication between said contacts when said card is inserted in said housing such that said conductive strip operationally couples said timer assembly to the power supply;
wherein said switching assembly has a first switch, said first switch being operationally coupled between the power source and an first of said contacts, said first switch being actuatable when said card is inserted in said housing, said first switch being adapted for controlling power from the power supply to said first of said contacts such that said first switch permits power to be supplied to said first of said contacts when said first switch is actuated by insertion of said card into said housing;

wherein said switching assembly has a second switch, said second switch being operationally coupled between the appliance and a second of said contacts, said second switch being actuatable when said card is inserted in said housing, said second switch being adapted for controlling power from said second of said contacts to the appliance when said second switch is actuated by insertion of said card into said housing and said conducting strip of said card electrically couples said contacts;

wherein said switching assembly has an activation bar, said activation bar being slidably coupled to said housing within said interior space of said housing such that said card engages said activation bar when said card is inserted into said interior space of said housing, said activation bar being coupled to said first switch and said second switch such that said activation bar actuates said first switch when said card engages said activation bar;

wherein a first relay being operationally coupled between one of said contacts and a second relay, said second relay being operationally coupled between said first relay and said timer assembly, said first relay being adapted for being energized by the power supply, said second relay being energized by said power supply through said first relay when said contacts contact said conductive strip, said second relay being for activating said timer assembly when said second relay is energized such that said timer assembly permits operation of said appliance for the pre-determined amount of time;

wherein said conductive strip of said card comprising a fusible link, said fusible link opening when a electrical current through said conductive strip exceeds a predetermined value such that electrical communication between said contacts is broken;

wherein said card has top wall and a bottom wall, said top wall and said bottom wall comprising a non-conductive material, said conductive strip being positioned between said top wall and said bottom, said bottom wall has a pair of apertures through said bottom wall, each of said apertures being aligned with one of a pair of ends of said conductive strip of said card, said apertures allowing each of said contacts to contact said conductive strip when said card is inserted into said interior space of said housing;

wherein said housing has a has a pair of rails, said rails being positioned within said interior space of said housing, said rails being extending from said slot in said perimeter wall such that said rails are for guiding said card into said interior space of said housing when said card is inserted into said housing;

wherein a first light being coupled to said housing, said first light being operationally coupled between said switching assembly and the power source, said first light emitting light when said power supply supplies power to said switching assembly and said first light;

wherein a second light being coupled to said housing, said second light being operationally coupled between said switching assembly and the appliance, said second light emitting light when said card is inserted into said interior space of said housing and actuates said switching assembly, said second light being adapted for indicating to the user that said timer assembly is operating.

13. An appliance timing system for permitting a user to use an appliance for a pre-determined amount of time, the appliance timing system comprising:

a housing has a perimeter wall defining an interior space, said perimeter wall of said housing being adapted for coupling to the appliance;

a switching assembly being positioned within said interior space of said housing, said switching assembly being operationally coupled between the appliance and a power source, said switching assembly being adapted for allowing power from the power source to be provided to the appliance when said switching assembly is actuated by the user;

a card being insertable into said interior space of said housing through a slot in said perimeter wall of said housing, said card actuating said switching assembly when said card is inserted into said slot of said housing by the user such that said switching assembly permits the power supply to provide power to the appliance;

a timer assembly being operationally coupled between said switching assembly and the appliance, said timer assembly being adapted for allowing the appliance to operate for the pre-determined amount of time before discontinuing power to the appliance;

said switching assembly has a pair of contacts, said contacts being positioned within said interior space of said housing, said contacts being in a spaced relationship with each other, said contacts selectively contacting a conductive strip on said card when said card is inserted into said housing, said conductive strip of said card permitting electrical communication between said contacts when said card is inserted in said housing such that said conductive strip operationally couples said timer assembly to the power supply;

said switching assembly has a first switch, said first switch being operationally coupled between the power source and an first of said contacts, said first switch being actuatable when said card is inserted in said housing, said first switch being adapted for controlling power from the power supply to said first of said contacts such that said first switch permits power to be supplied to said first of said contacts when said first switch is actuated by insertion of said card into said housing; and said switching assembly has an activation bar, said activation bar being slidably coupled to said housing within said interior space of said housing such that said card engages said activation bar when said card is inserted into said interior space of said housing, said activation bar being coupled to said first switch such that said activation bar actuates said first switch when said card engages said activation bar.

14. The appliance timing system as set forth in claim 13, further comprising;

said conductive strip of said card comprising a fusible link, said fusible link opening when a electrical current through said conductive strip exceeds a predetermined value such that electrical communication between said contacts is broken.

15. The appliance timing system as set forth in claim 13, further comprising;

said card has top wall and a bottom wall, said top wall and said bottom wall comprising a non-conductive material, said conductive strip being positioned between said top wall and said bottom, said bottom wall has a pair of apertures through said bottom wall, each of said apertures being aligned with one of a pair of ends of said conductive strip of said card, said apertures allowing each of said contacts to contact said conductive strip when said card is inserted into said interior space of said housing.

16. The appliance timing system as set forth in claim 13, further comprising;

said housing has a has a pair of rails, said rails being positioned within said interior space of said housing, said rails being extending from said slot in said perimeter wall such that said rails are for guiding said card into said interior space of said housing when said card is inserted into said housing.

17. The appliance timing system as set forth in claim 13, further comprising;

a first light being coupled to said housing, said first light being operationally coupled between said switching assembly and the power source, said first light emitting light when said power supply supplies power to said switching assembly and said first light.

18. The appliance timing system as set forth in claim 13, further comprising;

a second light being coupled to said housing, said second light being operationally coupled between said switching assembly and the appliance, said second light emitting light when said card is inserted into said interior space of said housing and actuates said switching assembly, said second light being adapted for indicating to the user that said timer assembly is operating.

* * * * *